June 27, 1939.  R. M. WHITE  2,163,860
MATERIAL FOR CONSERVING MOISTURE IN SOIL
Filed Aug. 15, 1938
INVENTOR.
BY Robert M. White.
Geo Stevens
ATTORNEY.

Patented June 27, 1939

2,163,860

UNITED STATES PATENT OFFICE 2,163,860

MATERIAL FOR CONSERVING MOISTURE IN SOIL

Robert M. White, Duluth, Minn.

Application August 15, 1938, Serial No. 224,983

3 Claims. (Cl. 47—9)

This invention relates to a new article of manufacture, particularly developed for the purpose of conserving moisture in soil, and to the method of such conservation.

There are doubtless many substances adaptable to such conservation, but extensive experiments have proven that none are more efficient or possess the inherent properties equivalent to moss peat, found in its natural state, and particularly where sphagnum moss is found to have formed such peat, large deposits of which are available in Minnesota as well as in many other localities.

It is well known that such peat has but very little if any actual fertilizer value, and this use of such natural product, after conversion, is not to be confused with peat used as fertilizer or as a vehicle for fertilizer, but rather solely as a covering for the soil, either cultivated or where left in its natural state in producing vegetation, such for example as in lawns, orchards, or the like, where cultivation is impracticable and possibly injurious to plant growth.

The novel features of the instant invention may be initially catalogued as follows: first, that element alone, having the most desirable natural characteristics for the purpose intended, to wit, peat; second, the size of the individual granules or pellets into which it is converted; third, the weight of each pellet; and fourth, the shape of each pellet; all of which are essential for optimum results in the use of the product.

Those sizes now considered as preferred range from 3/32" to 3/16" in diameter, and each cylinder is approximately its diameter in length.

Still another advantageous feature of this novel form of mulch, as applied only to the surface of the soil is that it not only permits falling water such as rain, sprinkling, or the like, to readily penetrate such mulch to the soil beneath same, but, being in granular, uniformly sized, and relatively heavy particles, has a marked tendency, when water is applied, to prevent initial run off and erosion, which normally occurs with lighter granular material.

The value of the mulching of soil is well understood, paper and other sheet material being much used at the time in preventing evaporation of moisture from the soil, and thus improving vegetable growth. However this method has proven quite expensive and laborious to carry out, and to accomplish the same results at less expense, together with providing additional advantages hereinafter described is the principal object of the present invention.

In the accompanying drawing, forming part of this application, I have shown an enlarged perspective view of the preferred form of peat pellet, though it is to be understood that the specific shape of the pellet may be varied somewhat if desired without departing from the spirit of the invention.

The property of natural peat to absorb and hold water is well known, and for that reason it is used extensively as chicken litter, fertilizer, etc., but such use of peat as found is impracticable because it is entirely too bulky and coarse for such purpose and therefore must be finely pulverized or macerated.

In its natural state it also is impractical for use as a soil covering, and even after being pulverized it is impractical for such purpose as it becomes subject to the elements in quickly drying out and being blown hither and yon by the wind.

However, if after natural peat is pulverized and partly dried, or at least brought to that stage of proper moisture content, it is subjected to extreme pressure and formed into very small cylindrical or other shaped pellets, it becomes quite a practical granular product, easy to handle, easy to apply, stays where it is put, and in addition has the property of, when first applied to the surface of the soil, taking up moisture therefrom, particularly in the lower layer of such covering, and soon enlarges or expands somewhat, forming virtually a sealed film beneath the uppermost less moist layers and thus effectively prevents evaporation of moisture from the soil.

Of course, eventually, by cultivation or otherwise these granules or pellets become incorporated with the soil, and, while having but little if any actual fertilizer value, as before stated, is known to improve materially the physical condition of the soil and assist in the retention of moisture therein, so that apart from the initial and novel functioning of the product, a lasting benefit will accrue to the soil.

A further advantage of these pellets, being made of natural peat and under great pressure is that no binder is necessary and that even after being subjected repeatedly to wet and dry conditions they do not loose their shape.

By repeated experiments it has been determined that the best results are obtained when the pellets are in the form of miniature, solid, cylinders and in which form they are most conveniently made.

Having thus described my invention, what I claim and desire to secure by Letters Patent, is:

1. A soil mulch consisting of natural peat in highly compressed very small cylindrical pellets.

2. A pellet for use as a soil mulch, said pellet consisting of highly compressed natural peat formed into very small cylindrically shaped pellets and of a density to provide sufficient weight to resist movement by normal air currents.

3. A fine granular mulch for agricultural purposes consisting of units of highly compressed natural peat, characterized by each unit being cylindrical in form and not materially larger in any dimension than 3/16 of an inch.

ROBERT M. WHITE.